United States Patent
Racineux et al.

(10) Patent No.: US 11,034,096 B2
(45) Date of Patent: Jun. 15, 2021

(54) METHOD OF ASSEMBLING TWO PIECES OF DIFFERENT MATERIALS AND ASSEMBLY RESULTING FROM THE METHOD OF ASSEMBLING

(71) Applicants: FAURECIA AUTOMOTIVE COMPOSITES, Nanterre (FR); Ecole Centrale de Nantes, Nantes (FR)

(72) Inventors: Guillaume Racineux, Chateau Thebaud (FR); Chady Khalil, Safra-Mont Liban (LB); Yannick Amosse, Carquefou (FR)

(73) Assignee: FAURECIA AUTOMOTIVE COMPOSITES

( * ) Notice: Subject to any disclaimer, the term of this patent is extended or adjusted under 35 U.S.C. 154(b) by 0 days.

(21) Appl. No.: 15/964,148

(22) Filed: Apr. 27, 2018

(65) Prior Publication Data
US 2018/0311907 A1 Nov. 1, 2018

(30) Foreign Application Priority Data
Apr. 28, 2017 (FR) ...................................... 1753783

(51) Int. Cl.
*B29C 65/00* (2006.01)
*B23K 20/06* (2006.01)
(Continued)

(52) U.S. Cl.
CPC .......... *B29C 66/1122* (2013.01); *B21D 26/14* (2013.01); *B21D 39/032* (2013.01);
(Continued)

(58) Field of Classification Search
CPC ...... B29C 66/1122; B21D 26/14; B23K 20/06
See application file for complete search history.

(56) References Cited

U.S. PATENT DOCUMENTS 3,365,522 A * 1/1968 Inoue ..................... B21D 26/14
264/450
4,319,708 A * 3/1982 Lomerson .............. B23K 20/02
228/111

(Continued)

FOREIGN PATENT DOCUMENTS

CN 202861226 U * 4/2013 ............. B21D 26/14
CN 105014224 A 11/2015
(Continued)

OTHER PUBLICATIONS

Machine Translation of the Description for DE102011006364A1 (Year: 2011).*
(Continued)

*Primary Examiner* — Jacob J Cigna
*Assistant Examiner* — Michael W Hotchkiss
(74) *Attorney, Agent, or Firm* — Carlson, Gaskey & Olds, P.C.

(57) ABSTRACT

A method of assembling a first part made from a metal and a second part includes providing a first part comprising an assembly surface, and a second part comprising at least one through orifice. At least part of the second part is arranged on the assembly surface such that the orifice extends across from the assembly surface. A metal connecting part is positioned on the orifice to cover the orifice across from the assembly surface. The connecting part and/or the assembly surface are projected on one another to obtain high-speed plating and welding between the connecting part and the surface part.

14 Claims, 6 Drawing Sheets

(51) Int. Cl.
  *B23K 20/227*   (2006.01)
  *B23K 20/233*   (2006.01)
  *B21D 26/14*    (2006.01)
  *B21D 39/03*    (2006.01)
  *B29C 65/56*    (2006.01)
  *B23K 103/10*   (2006.01)
  *B23K 103/14*   (2006.01)
  *B23K 103/18*   (2006.01)
  *B23K 103/00*   (2006.01)
  *B23K 103/16*   (2006.01)
  *B23K 103/22*   (2006.01)
  *B23K 103/20*   (2006.01)
  *B23K 103/12*   (2006.01)
  *B23K 103/24*   (2006.01)
  *B23K 103/04*   (2006.01)
  *B29C 65/38*    (2006.01)
  *B23K 31/02*    (2006.01)
  *B29L 31/00*    (2006.01)

(52) U.S. Cl.
  CPC .......... *B23K 20/06* (2013.01); *B23K 20/227* (2013.01); *B23K 20/2275* (2013.01); *B23K 20/233* (2013.01); *B23K 20/2336* (2013.01); *B23K 31/025* (2013.01); *B29C 65/38* (2013.01); *B29C 65/562* (2013.01); *B29C 66/43* (2013.01); *B29C 66/721* (2013.01); *B29C 66/742* (2013.01); *B23K 2103/04* (2018.08); *B23K 2103/10* (2018.08); *B23K 2103/12* (2018.08); *B23K 2103/14* (2018.08); *B23K 2103/172* (2018.08); *B23K 2103/18* (2018.08); *B23K 2103/20* (2018.08); *B23K 2103/22* (2018.08); *B23K 2103/24* (2018.08); *B23K 2103/42* (2018.08); *B29C 66/71* (2013.01); *B29C 66/7212* (2013.01); *B29C 66/72141* (2013.01); *B29C 66/72143* (2013.01); *B29C 66/7392* (2013.01); *B29C 66/7394* (2013.01); *B29C 66/73521* (2013.01); *B29C 66/7422* (2013.01); *B29C 66/74283* (2013.01); *B29L 2031/737* (2013.01)

(56) References Cited

U.S. PATENT DOCUMENTS

| | | | | |
|---|---|---|---|---|
| 4,627,565 | A * | 12/1986 | Lomerson | B23K 20/06 219/121.64 |
| 4,881,997 | A * | 11/1989 | Hatch | A44B 18/0076 156/66 |
| 6,579,161 | B1 * | 6/2003 | Chesley | A44B 18/00 451/359 |
| 7,927,681 | B2 * | 4/2011 | Cheng | A47C 31/023 428/100 |
| 7,959,057 | B2 * | 6/2011 | Criqui | B23K 20/06 228/115 |
| 9,183,488 | B2 * | 11/2015 | Gotou | H05K 3/4038 |
| 10,611,094 | B2 * | 4/2020 | Racineux | B29C 66/742 |
| 2005/0035178 | A1 * | 2/2005 | Martin | B21D 26/14 228/107 |
| 2005/0116011 | A1 * | 6/2005 | Durand | B23K 9/08 228/107 |
| 2010/0140328 | A1 * | 6/2010 | Olsson | B23K 20/06 228/115 |
| 2018/0050496 | A1 | 2/2018 | Racineux et al. | |

FOREIGN PATENT DOCUMENTS

| | | | | |
|---|---|---|---|---|
| DE | 102010052457 A1 | | 5/2012 | |
| DE | 102011051639 A1 * | | 1/2013 | .......... B21D 39/031 |
| DE | 102011006364 A1 * | | 3/2013 | .......... B60N 2/0732 |
| EP | 2324939 B1 * | | 6/2012 | .......... B21D 26/14 |

OTHER PUBLICATIONS

CN-202861226-U machine translation (Year: 2013).*
DE-102011051639-A1 machine translation (Year: 2013).*
Search Report for French Application No. 1753783, dated Jan. 19, 2018.

* cited by examiner

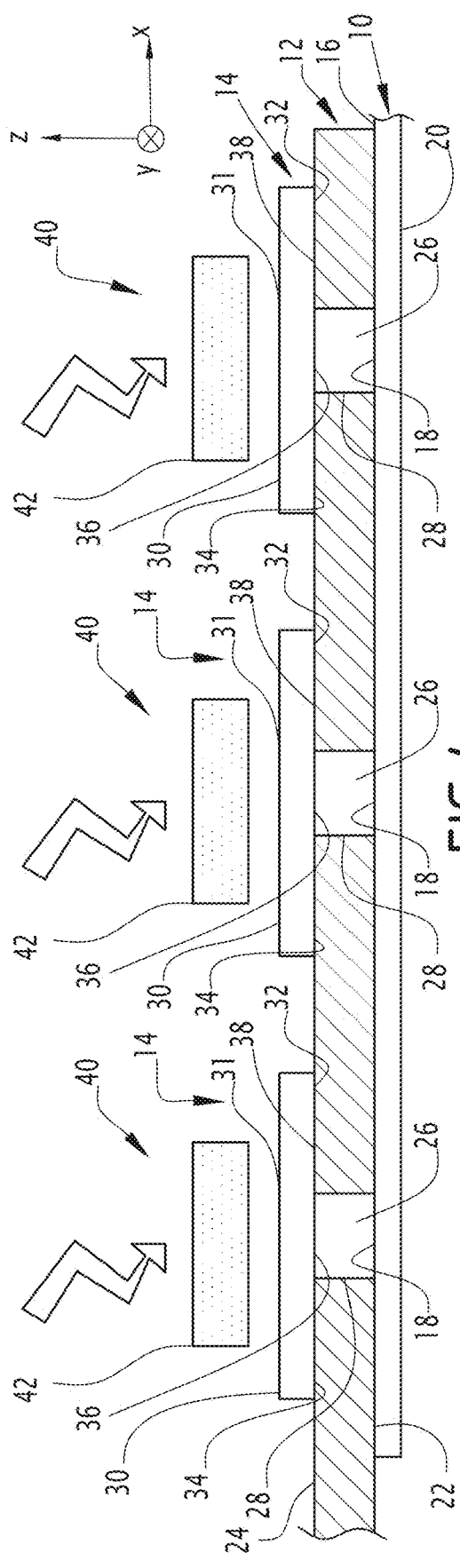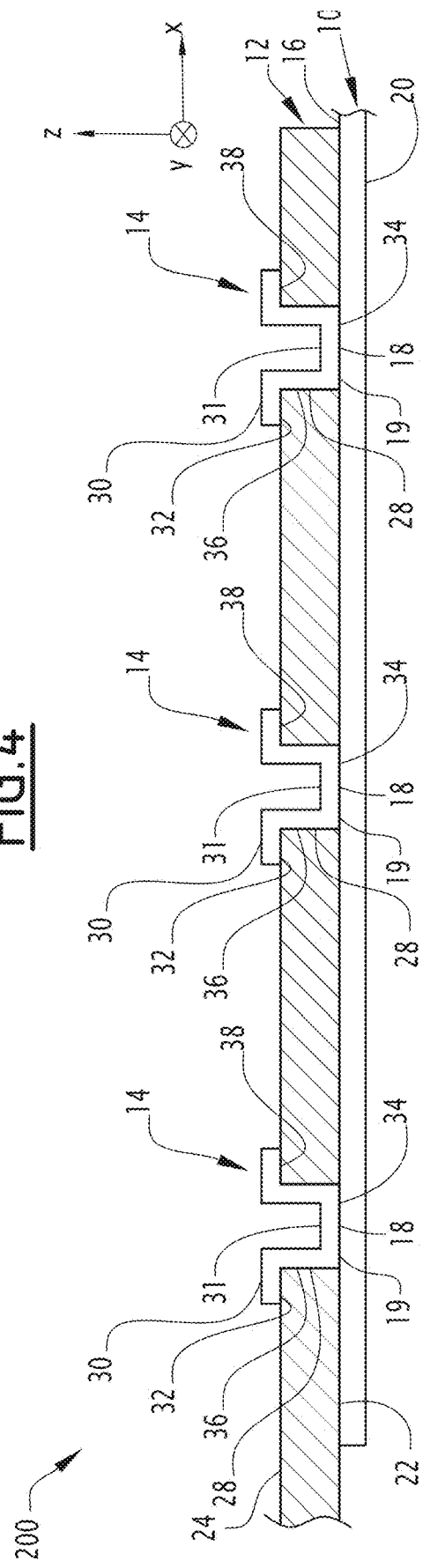

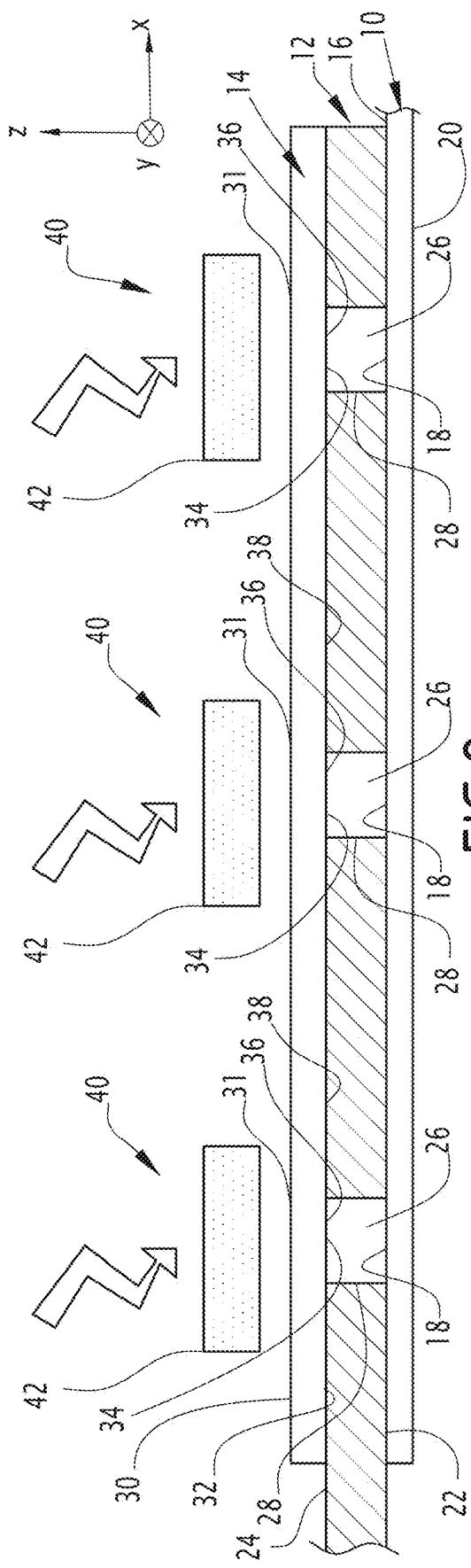
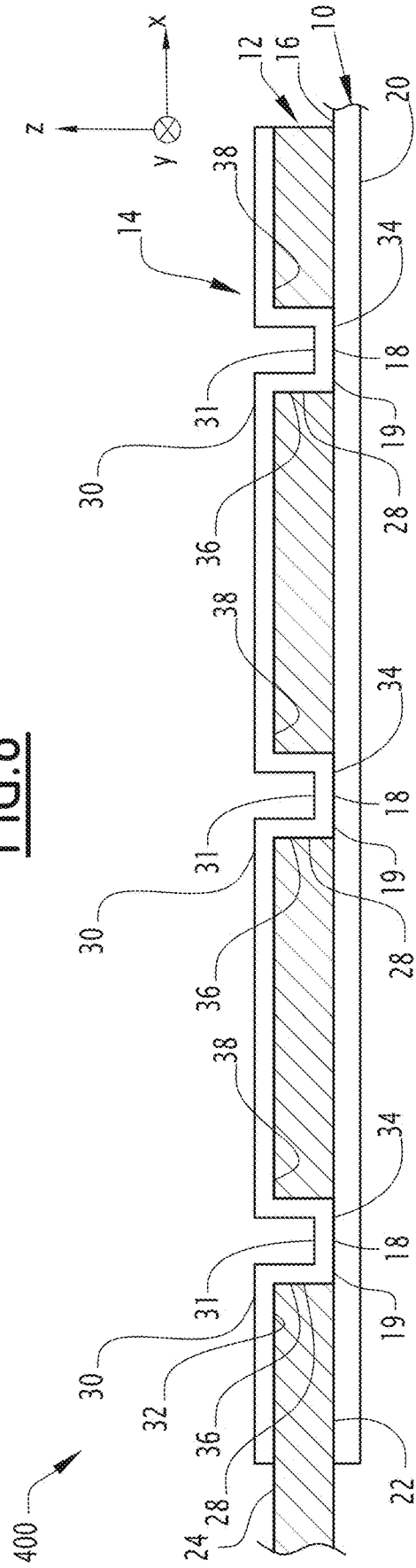

METHOD OF ASSEMBLING TWO PIECES OF DIFFERENT MATERIALS AND ASSEMBLY RESULTING FROM THE METHOD OF ASSEMBLING

CROSS-REFERENCE TO RELATED APPLICATION

This application claims priority to FR 1753783, filed Apr. 28, 2017.

FIELD OF INVENTION

The present invention relates to a method of assembling a first part made from a metal and a second part.

The invention also relates to an assembly comprising a first part made from a metal, a second part, and a connecting part made from a metal, resulting from such an method of assembling.

BACKGROUND

In many fields, in particular the transportation field, multi-material structures are becoming generalized to satisfy growing user requirements (in particular regarding lighter structures, esthetics, and implementation of new functionalities, such as electric installation or shock absorption).

There is thus a frequent need to combine parts made from metal and parts made from composite materials with a polymer matrix, or to assemble metal parts having different properties, in particular different masses, to one another.

To ensure satisfactory rigidity of two assembled parts, it is often preferable to produce close connections, generally obtained by welding.

Yet in practice, metal materials and composite materials with a polymer matrix, or certain metal materials, are not compatible with one another for the implementation of heterogeneous welding. For this reason, the current technologies for assembling such materials are:
mechanical assembly, for example screwing or riveting, and
assembly by adhesion, in particular by gluing.

However, the mechanical assembly technology in particular has the drawback of making the structure heavier due to attached connecting elements. Furthermore, piercing the parts to position these connecting elements may generate fragile, stress concentration, or break initiation areas.

Assembly by gluing has the drawback of requiring preparation of the surfaces, and also not allowing the long-term behavior of this gluing to be predicted reliably.

Document WO 2016/097656 describes a method for assembling a part made from metal and a composite material. This document provides for attaching an insert in the composite part, at a surface to be welded, part of the insert being arranged to be exposed in order to be assembled using a magnetic pulse welding technique with a complementary surface of the metal part.

However, such a method requires a step for preparing the composite part in order to add the insert therein. Such a step may be difficult and tedious to carry out. Furthermore, in order to implement magnetic pulse welding, a space must be arranged between the surface to be welded of the composite part and the complementary surface of the metal part to allow the surfaces to be welded to be projected toward one another at a high speed. The method requires a particular installation to maintain this space. Furthermore, such a method is not suitable for robotization. The assembly of the parts at a builder is therefore time-consuming and costly.

In this context, there is a need for new technologies for robotized assembly between parts made from different materials.

SUMMARY

The invention provides to a method of assembling a first part made from a metal and a second part, comprising the following steps:
providing a first part made from metal and comprising an assembly surface, and a second part, the second part comprising at least one through orifice,
arranging at least part of the second part on the assembly surface of the first part such that the through orifice extends across from said assembly surface,
positioning a metal connecting part on the through orifice of the second part to cover said through orifice across from the assembly surface of the first part, part of the second part comprising said through orifice extending between the assembly surface and said metal connecting part,
projecting the metal connecting part and/or the assembly surface on one another, to obtain high-speed plating of the metal connecting part and the assembly surface on one another and to obtain welding between the metal connecting part and the assembly surface.

The method according to the invention does not require a step for preparing the second part to add an insert, and mounting the insert in the second part. Furthermore, the method according to the invention does not require arranging a space between the metal part and the second part, the space between the metal part and the connecting part being formed by the through orifice of the second part. The method according to the invention can therefore easily be completely robotized.

According to specific embodiments, the method includes one or more of the following features, considered alone or according to any technically possible combinations:
the connecting part and/or the assembly part are projected on one another at a speed greater than or equal to 150 meters per second,
the second part is made from a polymer matrix composite material,
the second part is made from a metal not suitable for being welded with the metal of the metal part,
at least two connecting parts are provided, the second part comprises at least two through orifices, and each connecting part is positioned on a respective through orifice of the second part to cover said orifice across from the assembly surface of the first part,
the second part comprises at least two through orifices, and the connecting part is positioned on the through orifices of the second part to cover said through orifices across from the assembly surface of the first part,
the connecting part includes two opposite faces, one face intended to be welded and the other face being a free surface having reliefs forming hook spurs,
the connecting part and/or the first part includes an exposed surface opposite a surface to be welded, and in which the projection step is obtained using a magnetic pulse applied on the exposed surface,
at least one of the arranging, positioning or projection steps is robotized.

The invention also relates to an assembly comprising two parts made from metal and one part made from a polymer matrix composite or a light metal, resulting from a method of assembling according to the invention, in which the second part comprises at least one through orifice through which the connecting part is welded with the assembly surface of the first part.

BRIEF DESCRIPTION OF THE DRAWINGS

Other aspects and advantages of the invention will appear upon reading the following description, provided as an example, and done in reference to the appended drawings, in which:

FIG. 4 is a schematic sectional illustration of two parts according to a second embodiment to be assembled using the method according to the invention, FIG. 5 is a schematic sectional illustration of an assembly obtained by the method according to the invention for assembling two parts of FIG. 4, FIG. 8 is a schematic sectional illustration of two parts according to a fourth embodiment to be assembled using the method according to the invention, FIG. 9 is a schematic sectional illustration of an assembly obtained by the method according to the invention for assembling two parts of FIG. 8.

DETAILED DESCRIPTION

Figure 1:
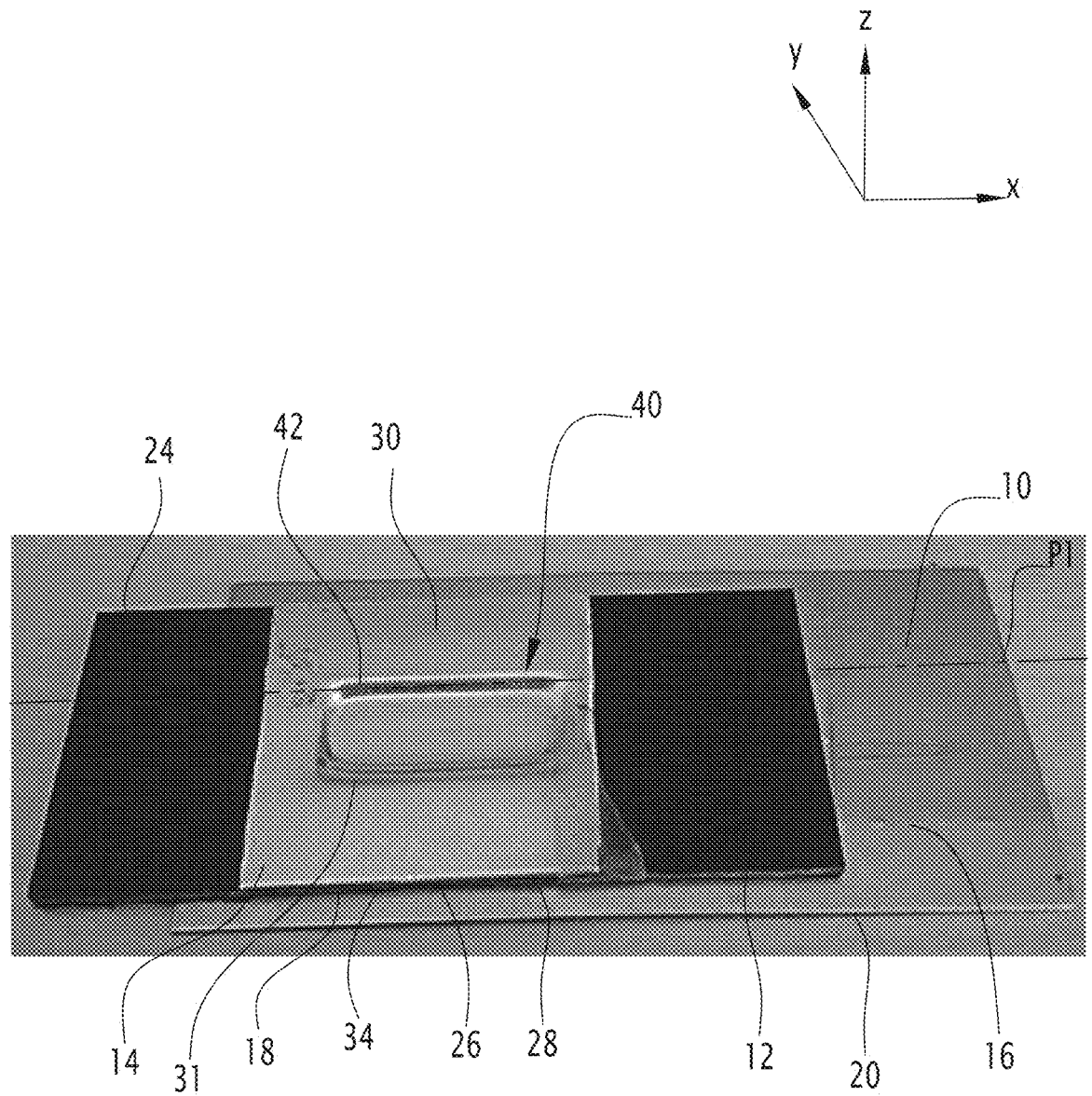
FIG. 1 is a perspective illustration of two parts to be assembled using the method according to the invention.

FIG. 1 shows a first part 10 made from metal, a second part 12 to be assembled with the first part, and a connecting part 14 for assembling the first part 10 with the second part 12.

For simplification reasons, the first part 10 is also referred to as "metal part 10".

FIG. 1 shows a trihedron X, Y, Z. The parts 10, 12, 14 are arranged relative to one another in an elevation direction Z.

A thickness is defined as the dimension in the elevation direction Z.

The metal part 10 advantageously assumes the form of a plane at least in the area to be assembled with the second part 12. In this area, the metal part 10 extends in a longitudinal direction X perpendicular to the elevation direction Z and in a transverse direction Y perpendicular to the longitudinal direction X and to the elevation direction Z.

Figure 2:
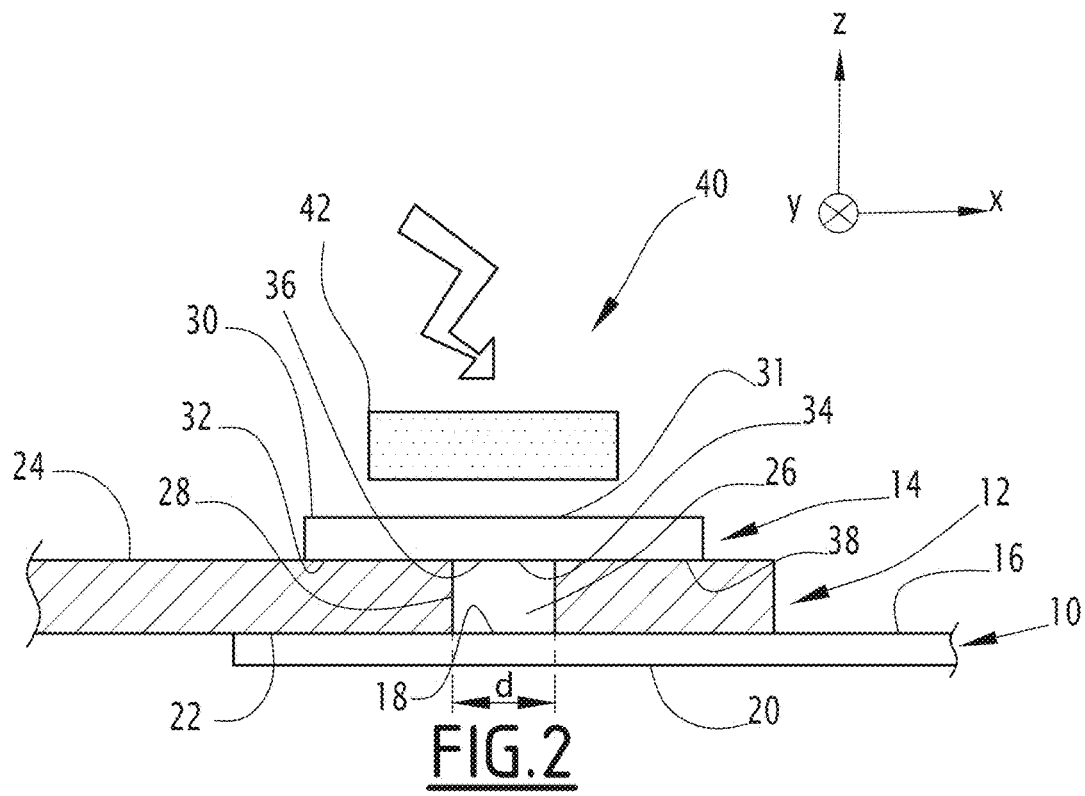
FIG. 2 is a schematic sectional illustration of two parts to be assembled using the method according to the invention.

FIG. 2 is a sectional view of the parts 10, 12, 14 of FIG. 1 in a plane P1 perpendicular to the transverse direction Y.

Figure 3:
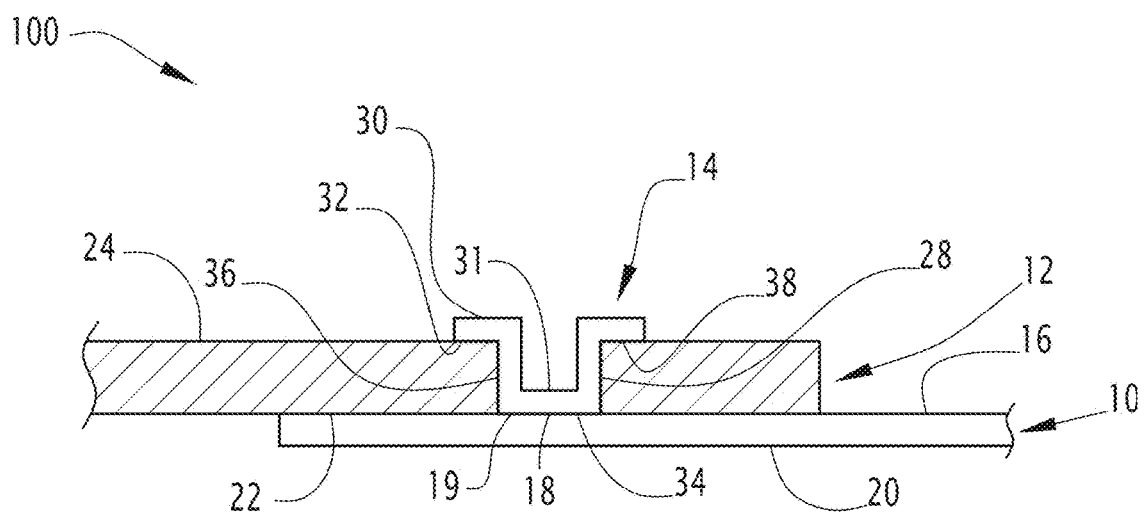
FIG. 3 is a schematic sectional illustration of an assembly obtained by the method according to the invention for assembling two parts of FIG. 2.

This metal part 10 in particular includes two opposite faces: a front face 16, intended to come into contact with the second part 12 and across from the connecting part 14 and including an assembly part 18 for forming part of a welding area 19 visible in FIG. 3, and a rear face 20, opposite said front face 18.

The metal part 10 is, for example, made from a metal chosen from among steel or an aluminum alloy.

The second part 12 advantageously assumes the form of a plane at least in the area to be assembled with the metal part 10. The second part 12 has a thickness in the elevation direction Z comprised between 0.5 mm and 10 mm. This second part 12 in particular includes two opposite faces: a front face 22, intended to come into contact with the metal part 10, and a rear face 24, opposite the front face 22 and intended to come into contact with the connecting part 14.

The second part 12 comprises at least one through orifice 26.

According to the example of FIGS. 1 and 2, the second part 12 includes a through orifice 26.

The through orifice 26 emerges at the front 22 and rear 24 faces of the second part 12 and extends through the thickness of the second part in the elevation direction Z.

The through orifice 26 is delimited by a contour 28. This contour 28 is, for example, rectangular, as shown in FIG. 1, or can be cylindrical, flared, etc.

Preferably, in the case of a circular orifice, the maximum distance d in a plane perpendicular to the elevation direction Z between two contour parts 28 facing one another (i.e., the diameter) is less than or equal to 50 mm.

In the case of a rectangular orifice, the maximum distance d corresponding to the length is less than or equal to 100 mm. The width of the rectangular orifice is less than or equal to 50 mm.

Preferably, the second part 12 has, at least near the through orifice 26, a thickness in the elevation direction Z substantially comprised between 0.5 mm and 3 mm.

Indeed, this thickness must not be too large, such that the method of assembling described below can be carried out.

According to one embodiment, the second part 12 is made from a composite material comprising a reinforcement, generally fibers, and a polymer matrix material.

The fibers of the reinforcement are made from a material chosen from among a metal, glass, a polymer, carbon, plant, etc.

The fibers are chosen from among short fibers, a large dimension of which, called length of the fibers, is comprised between 0.1 mm and 1 mm, long fibers, whose length is comprised between 1 mm and 50 mm, and continuous fibers, whose length is greater than 50 mm.

The fibers are arranged to form a mat reinforcement, a woven reinforcement, or a NCF multi-material reinforcement. The continuous fibers are arranged parallel to one another, for a unidirectional reinforcement, or according to a predefined angle (for example, 45° relative to one another) for a multidirectional reinforcement, or randomly. NCF (Non-Crimp Fabrics) refers to a multiaxial fabric that is made up of several unidirectional (UD) laps (or layers), sewn to one another with a thread generally made from polyethylene terephthalate. For example, a +45°/−45° biaxial NCF material is a fabric made up of two UD laps: the first lap is made up of UD at +45° and the second lap is made up of UD at −45°. There are also 0°/90° biaxial NCF materials, 0°/+45°/−45° triaxial NCF materials or multiaxial NCF materials made up of more than 3 laps.

This composite material can also be stratified, i.e., made up of several plies with varied orientations (not shown). "Ply" commonly refers to a composite semi-finished product (fibers plus matrix) presented in a quasi-two-dimensional form; it also refers to a layer made up of parallel rovings connected by the matrix, the rovings in turn being made up of parallel fibers.

The polymer matrix is advantageously chosen from among thermosetting materials and thermoplastic materials.

The thermosetting material is, for example, chosen from among the following materials: unsaturated polyester (UP) resins, which are generally used with glass fibers, epoxide resins (EP), which are generally used with carbon fibers, vinylester resins, polyurethane resins, phenolic (PF) resins, thermosetting polyimide resins (PI RP) and polybismaleimides (BMI).

The thermoplastic material is, for example, chosen from among the following materials: polypropylene, polyamide, polyethylene terephthalate (PET), polyetherimide (PEI), polyphenylene sulfide (PPS), and polyphenylene ether ether ketone (PEEK).

According to another embodiment, the second part 12 is made from a metal or a metal alloy not suitable for being welded with the metal of the metal part 10, such as a metal different from steel.

Examples of metal not suitable for being welded with the metal of the metal part 10 include aluminum, titanium, and generally metals with very different melting points for which the intermetallics will be in thick layers due to the significant temperature increase and the long welding duration relative to the dynamic plating method.

The connecting part 14, for example, assumes the form of a plate.

Such a connecting part 14 includes: an outer face 30, including an exposed surface 31 of the connecting part 14, an opposite inner face 32, comprising a surface 34 intended to be welded to the assembly surface 18 of the metal part 10, a surface 36 intended to come into contact with the contour 28 of the orifice 26, and a surface 38 intended to come into contact with the rear face 24 of the second part 12.

According to one embodiment, the connecting part 14 is generally square or rectangular. For example, for information, each connecting part 14 has a large dimension called a length comprised between 10 mm and 100 mm and a small dimension called a width taken perpendicular to the length and comprised between 10 mm and 60 mm.

For example, this connecting part 14 has a thickness in the elevation direction Z comprised between 0.1 mm and 3 mm.

Alternatively, the connecting part 14 has another shape, for example oval, circular or any other shape.

The connecting part 14 is made from a material that is chosen based on the material making up the metal part 10 to be assembled. In particular, this material is chosen to allow a welding technique by dynamic plating between the surface 34 to be welded of the connecting part 14 and the assembly surface 18 of the metal part 10. For example, this connecting part 14 is made from steel or an aluminum alloy when the metal part 1 is made from an aluminum alloy.

Other possible combinations of materials are, but are not limited to: Aluminum-aluminum, Aluminum-copper, Aluminum-magnesium, Aluminum-titanium, Copper-copper, Copper-steel, Copper-bronze, Nickel-titanium, Nickel-nickel, Steel-steel.

Figure 10:
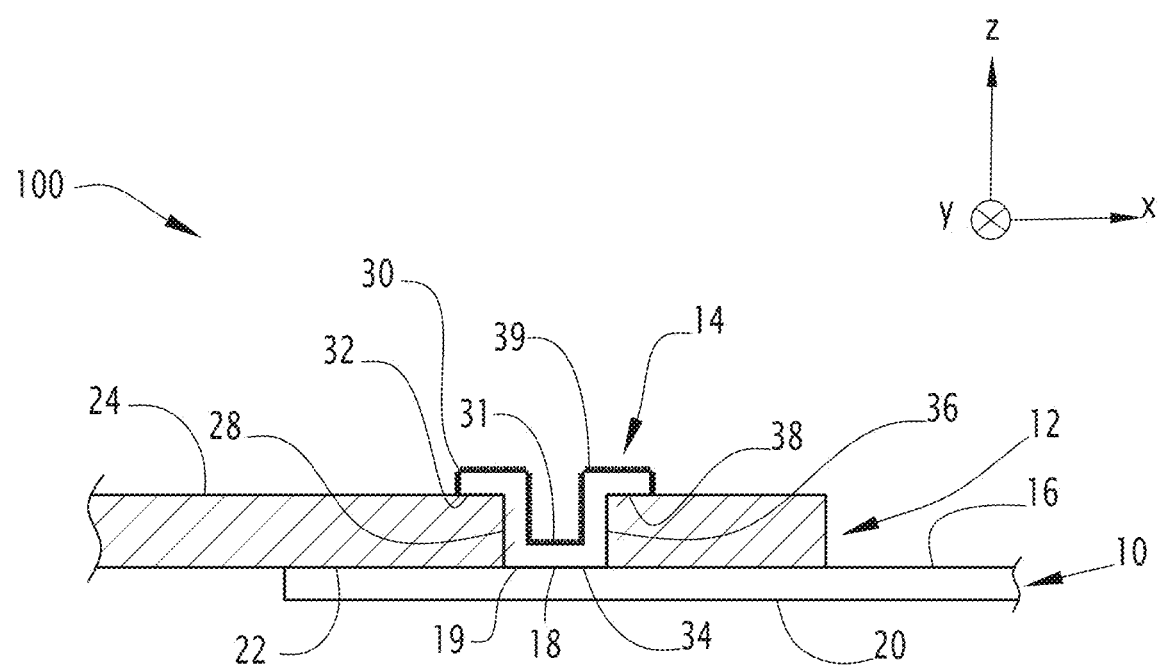
FIG. 10 is a schematic sectional illustration of two parts to be assembled using the method according to the invention by a connecting part according to one particular embodiment.

According to one particular embodiment shown in FIG. 10, the outer face 30 of the connecting part 14 is a free surface having reliefs forming hook spurs 39. The hook spurs 39 for example have a thickness in the elevation direction Z comprised between 0.1 mm and 2 mm. Such hook spurs 39 add mechanical catching by self-gripping. The hook spurs 39 allow elements to be fastened on the assembly.

Such hook spurs 39 are, for example, made, as is known in itself, by gluing, welding, stamping, or cutting followed by bending.

According to one embodiment, at least one from among the metal part 10, the second part 12, and the connecting part 14 is a three-dimensional part having a complex shape outside the area to be assembled.

One example method for assembling the metal part 10 with the second part 12 using the connecting part 14 will now be described.

"Assembly" in particular refers to a permanent, or non-removable, connection between the two parts 10, 14 at the welding area 19. "Assembly" in particular refers to "welding" ensuring continuity of the nature of the materials to be assembled. "Assembly" refers to assembly by high-speed plating, preferably in the form of a welding technique by magnetic pulse.

"High speed" in particular refers to a speed greater than or equal to 150 m/s, preferably comprised between 150 m/s and 400 m/s.

According to the invention, the assembly surface 18 of the metal part 10 is intended to be assembled, using a high-speed projection technique, with the surface to be welded 34 of the connecting part 14.

Such a method of assembling is, for example, carried out at an automobile builder using robots.

To that end, the method of assembling according to the invention comprises the following successive steps:

providing two parts 10, 12 to be assembled, arranging at least part of the second part 12 on the assembly surface 18 of the first part 10 such that the through orifice 26 of the second part 12 extends across from the assembly surface 18, positioning the connecting part 14 on the through orifice 26 of the second part to cover the orifice 26 across from the assembly surface 18 of the first part 10, part of the second part 12 comprising the orifice 26 extending between the assembly surface 18 and the connecting part 14, and projecting the connecting part 14 and/or the assembly surface 18 at a speed greater than or equal to 150 meters per second, on one another, to obtain high-speed plating of the connecting part 14 and the surface part 18 on one another and to obtain welding between the connecting part 14 and the assembly surface 18.

Starting from a metal part 10, a second part 12, and a connecting part 14, as described above, the relative arrangement steps of the metal part 10 and the connecting part 14 with respect to the second part 12 are carried out such that the surface 34 to be welded and the assembly surface 18 are arranged across from one another on either side of the orifice 26.

The space necessary for movement is formed by the second part 12, which serves as a spacer between the metal part 10 and the connecting part 14. Thus, it is not necessary to provide additional spacing between the metal part 10 and the connecting part 14.

The exposed surface 31 of the connecting part 14 is opposite the surface 34 to be welded and is directly accessible to a welding tool to carry out the projection step.

This positioning step is advantageously robotized.

The projection step is in turn carried out to obtain high-speed plating of the surface 34 to be welded and the assembly surface 18 on one another and to obtain welding between the surface 34 to be welded of the connecting part 14 and the assembly surface 18 of the metal part 10.

During the high-speed projection step, the surface 34 to be welded of the connecting part 14 is thus plated at a high speed on the assembly surface 18 of the metal part 10, then causing a welding phenomenon between the connecting part 14 and the assembly surface 18 of the metal part 10 by atomic attachment. A connection is thus obtained by welding, without adding material, between the connecting part 14 and the metal part 10.

This projection step is advantageously carried out using a pulse that is applied on the exposed surface 31 of the connecting part 14.

A projection force is thus applied on this exposed surface 31 in the elevation direction Z, and oriented toward the assembly surface 18 of the metal part 10.

The projection step is advantageously obtained using magnetic pulse projection 40.

Alternatively, the pulse is applied on the rear face 20 of the metal part 10, in the elevation direction Z, and oriented toward the surface 34 to be welded of the connecting part 14.

A welding cycle, traditional in itself, can be summarized by the following 6 steps:
- a charger is powered by an electric grid;
- the electrical energy is then stored in capacitors in the form of electrostatic energy, the stored energy gradually being increased via the charge voltage commanded by an energy control unit;
- when the set threshold for the charge voltage is reached, a spark-gap (or unloader) very quickly unloads the electrostatic energy from the capacitors into an inductor 42 (during this unloading, the duration of which is about several microseconds, extremely high electric currents of around several hundred kA (kiloamperes) are generated);
- the circulation of this high current through the inductor 42 very abruptly generates a magnetic induction field in the coil; electrostatic energy is converted into magnetic energy; the magnetic field thus created may have a high amplitude (of around several tens of tesla); the magnetic field is highly variable over time, and therefore generates induced currents, also called "Foucault currents", in the connecting part 14 to be welded;
- the interaction between the primary magnetic field created by the coil and the currents induced in the connecting part 14 generates substantial forces of magnetic origin, forces acting mechanically on the connecting part 14 in which the Foucault currents circulate; and
- these magnetic forces very abruptly convert the magnetic energy into mechanical energy acting radially on the exposed surface 31 of the connecting part 14, the latter then being propelled onto the metal part 10, which is kept stationary.

This projection phenomenon is thus the result of an extremely fast energy transfer, the power of this process being around several hundred megawatts, but over very short durations.

This process is practically adiabatic and there is almost no heat transfer: the welding between the connecting part 14 and the metal part 10 is done "cold". Indeed, the materials advantageously do not reach more than 30° C. There is therefore no thermally affected area in the composite material that does not lose its properties. The method according to the invention makes it possible not to deteriorate the second part 12 in the welding area 19.

The magnetic pulse welding method also constitutes a welding method of the "solid state" type, which means that the material is not melted during the welding cycle.

Alternatively, it is possible to consider using any other technique suitable for producing a high-speed projection, for example through mechanical action or through a laser impact.

Under the effect of the propulsion force, the connecting part 14 is locally deformed such that the surface 34 to be welded is pressed at a high speed against the assembly surface 18 of the metal part 10.

The surface 36 is pressed against the contour of the through orifice 26 of the second part 12.

Thus, the second part 12 is sandwiched between the front face 16 of the metal part 10 and the surface 38 of the connecting part 14.

The local deformation of the connecting part 14 is a plastic deformation. There is no resilient return after plating of the surface 34 to be welded on the assembly surface 18 of the metal part 10.

This high-speed plating then generates a welding phenomenon between the surface 34 to be welded of the connecting part 14 and the assembly surface 18 of the metal part 10.

The projection step is advantageously carried out so as to obtain gradual plating of the surface 34 to be welded on the assembly surface 18, to ensure an expulsion of the oxides.

"Gradual plating" in particular refers to contact of the surface 34 to be welded and assembly surface 18, which begins by a point at the center of the surface 34 to be welded, then which extends over a line toward the periphery of the surface 34 to be welded, before spreading until all of the two surfaces 34, 18 are in contact.

Thus, the metal part 10 and the connecting part 14 are advantageously welded while forming a weld seam having an elliptical shape.

Preferably, the projection step is robotized. The inductor 42 is mounted on a robot, and the projection step is carried out as previously described.

A multi-material assembly 100 is thus obtained, shown in FIG. 3, comprising the first part 10 made from a metal, the second part 12, and the connecting part 14 made from a metal.

In the assembly 100, the connecting part 14 is welded with the assembly surface 18 of the metal part 10 through the through orifice 26 of the second part 12.

The surface 34 to be welded is in contact with the assembly surface 18 of the metal part 10.

The surface 36 is in contact with the contour 28 of the through orifice 26 of the second part 12.

The surface 38 is in contact with the rear face 24 of the second part 12 near the orifice 26.

Thus, the connecting part 14 after welding has, in the welding area 19, a shape substantially complementary to the contour of the orifice 26 of the second part 12.

Different embodiments can be considered, as described in more detail below in connection with FIGS. 4 to 9.

According to the example of FIG. 4, the second part 12 comprises a plurality of through orifices 26. An equal number of connecting parts 14 as previously described and orifices 26 are provided. The metal part 10 comprises an equal number of assembly surfaces 18 and orifices 26.

At least part of the second part 12 is arranged on each assembly surface 18 of the first part 10 such that each through orifice 26 of the second part 12 extends across from said assembly surface 18. Each connecting part 14 is positioned on each respective through orifice 26 of the second part 12 so as to cover said orifices 26 across from each assembly surface 18 of the first part 10.

Part of the second part 12 comprising said orifices 26 extends between each assembly surface 18 and each connecting part 14.

The projection step is identical for the three connecting parts 14 to be assembled in the projection step previously described for a connecting part 14. The obtained assembly 200 is shown in FIG. 5.

Each connecting part 14 is welded with each assembly surface 18 of the first part 10 through each respective through orifice 26 of the second part 12.

Figure 6:
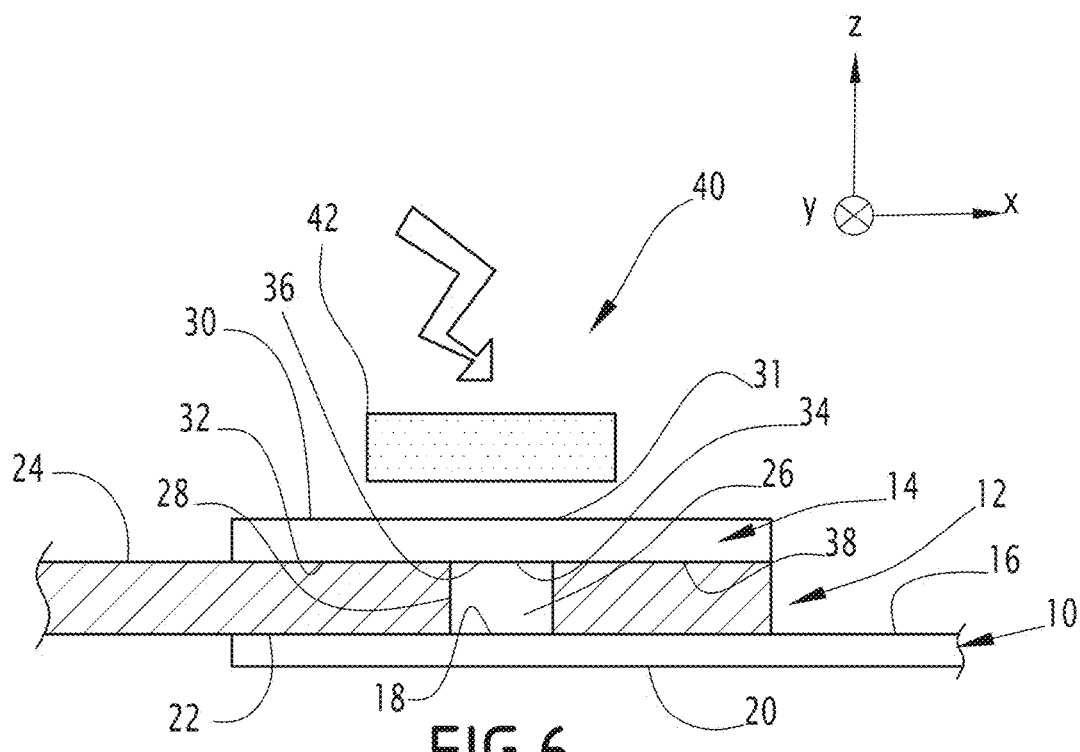
FIG. 6 is a schematic sectional illustration of two parts according to a third embodiment to be assembled using the method according to the invention.

According to the example of FIG. 6, the second part 12 includes a through orifice 26 and the connecting part 14 completely covers the second part 12 in at least one dimension of the second part 12, for example its width.

The method of assembling is identical to the method previously described in the case of a through orifice 26.

Figure 7:
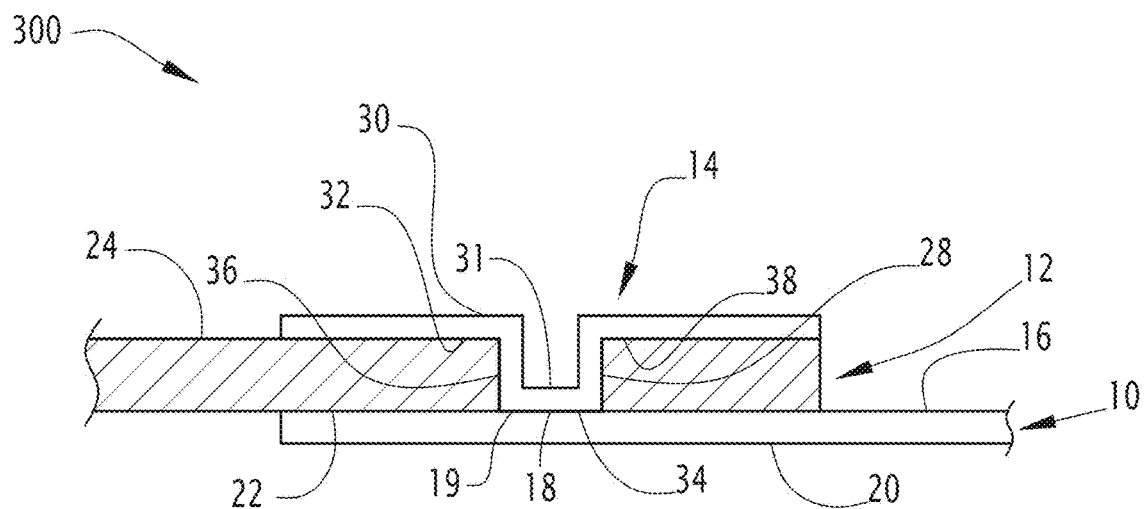
FIG. 7 is a schematic sectional illustration of an assembly obtained by the method according to the invention for assembling two parts of FIG. 6.

The obtained assembly 300 is shown in FIG. 7.

The connecting part 14 is welded with the assembly surface 18 of the metal part 10 through the through orifice 26 of the second part 12.

The surface 38 is in contact with the rear face 24 of the second part 12 over the entire rear face of the second part 12.

According to the example of FIG. 8, the second part 12 comprises a plurality of through orifices 26. The connecting part 14 completely covers at least all of the through orifices 26. The connecting part 14 comprises an equal number of surfaces 34 to be welded and through orifices 26. The metal part 10 comprises an equal number of assembly surfaces 18 and through orifices 26.

At least part of the second part 12 is arranged on each assembly surface 18 of the first part 10 such that each through orifice 26 of the second part 12 extends across from each assembly surface 18.

The connecting part 14 is positioned on each through orifice 26 of the second part 12 to cover said orifices 26 across from each assembly surface 18 of the first part 10.

Part of the second part 12 comprising said orifices 26 extends between each assembly surface 18 and the connecting part 14.

The projection step is identical for each surface 34 to be welded of the connecting part 14 in the projection step previously described for a connecting part 14.

The obtained assembly 400 is shown in FIG. 9.

The connecting part 14 is welded with each assembly surface 18 of the first part 10 through each respective through orifice 26 of the second part 12.

The surface 38 is in contact with the rear face 24 of the second part 12 over the entire rear face of the second part 12.

In general, the present invention has the interest of allowing a robotized assembly between parts made from different materials. The method according to the invention does not require a step for preparing the second part 12 to add an insert, and mounting the insert in the second part 12. The second part 12 is simply transformed by piercing through orifices 26 before welding. Thus, the method according to the invention does not require arranging a space between the metal part 10 and the second part 12, the space between the metal part and the connecting part being formed by the through orifice(s) 26 of the second part 12.

The method according to the invention is therefore simple and compatible with assembly lines by welding for motor vehicle bodies and satisfying mass production rhythms. The cold welding does not damage the second part 12.

The invention claimed is:
1. A method of assembling a first part made from a metal and a second part, comprising the following steps:

providing a first part made from metal and comprising an assembly surface, and a second part, said second part comprising at least one through orifice, wherein the second part has a first surface parallel to an xy-plane and in contact with the assembly surface and a second surface parallel to and opposite the first surface, and wherein the at least one through orifice is delimited by a contour that forms a wall surface extending from the first surface to the second surface, and wherein the contour of the at least one through orifice is rectangular in the xy-plane;

arranging at least part of the second part on the assembly surface of the first part such that the at least one through orifice extends across from said assembly surface, positioning a metal connecting part on the at least one through orifice of the second part to cover said at least one through orifice across from the assembly surface of the first part, part of the second part comprising said at least one through orifice extending between the assembly surface and said metal connecting part, and wherein the metal connecting part has an outer face and an inner face opposite the outer face, wherein the inner face includes a bottom surface portion to be welded to the assembly surface of the first part, a peripheral surface portion configured to come into contact with the contour of the wall surface of the at least one through orifice in the second part, and a surface portion that is to come into contact with the second surface of the second part, and wherein the bottom surface portion comprises a flat surface that extends from one side of the peripheral surface portion to an opposite side of the peripheral surface portion, and wherein the peripheral surface portion extends from the bottom surface portion to the surface portion along an entirety of the wall surface, and projecting the metal connecting part and/or the assembly surface on one another to obtain high-speed plating of the metal connecting part and the assembly surface on one another and to obtain welding between the metal connecting part and the assembly surface, the metal connecting part and/or the assembly surface being projected on one another at a speed greater than or equal to 150 meters per second, and wherein the metal connecting part is welded at the bottom surface portion to the assembly surface, the peripheral surface portion is in contact with the contour of the wall surface of the at least one through orifice, and the outer face is a free surface having reliefs forming hook spurs, and wherein, after welding, the bottom surface portion is parallel to and in direct contact with the assembly surface, the peripheral surface portion is parallel to and in direct contact with the contour of the wall surface of the at least one through orifice, the surface portion is parallel to and in direct contact with the second surface of the second part, and wherein an entirety of the peripheral surface portion is perpendicular to the bottom surface portion, the entirety of the peripheral surface portion is perpendicular to the surface portion, and the surface portion and the bottom surface portion are parallel to each other.

2. The method of assembling according to claim 1, wherein the second part is made from a polymer matrix composite material.

3. The method of assembling according to claim 1, wherein the second part is made from a metal not suitable for being welded with the metal of the first part.

4. The method of assembling according to claim 1, wherein at least two metal connecting parts are provided, the at least one through orifice of the second part comprises at least two through orifices, and each connecting part is positioned on a respective through orifice of the second part to cover said respective through orifice across from the assembly surface of the first part.

5. The method of assembling according to claim 1, wherein the at least one through orifice of the second part comprises at least two through orifices, and the metal connecting part is positioned on the two through orifices of the second part to cover said two through orifices across from the assembly surface of the first part.

6. The method of assembling according to claim 1, wherein the metal connecting part and/or the first part includes an exposed surface opposite a surface to be welded, and in which the projection step is obtained using a magnetic pulse applied on the exposed surface.

7. The method of assembling according to claim 1, wherein at least one of the arranging, positioning, or projection steps is robotized.

8. The method of assembling according to claim 1, wherein the metal connecting part after welding has a shape complementary to the contour of the wall surface of the at least one through orifice of the second part.

9. The method of assembling according to claim 1, wherein the at least one through orifice of the second part comprises a plurality of through orifices, and wherein the metal connecting part comprises a single metal connecting part that is positioned to cover all through orifices of the second part.

10. The method of assembling according to claim 9, wherein the plurality of through orifices comprises at least three through orifices.

11. An assembly comprising:
a first part made from metal and having an assembly surface;
a second part having a first surface parallel to an xy-plane and in contact with the assembly surface and a second surface parallel to and opposite the first surface, and the second part including at least one through orifice that is delimited by a contour that forms a wall surface extending from the first surface to the second surface, and wherein the contour of the at least one through orifice is rectangular in the xy-plane;
a connecting part made from metal, and wherein the connecting part has an outer face and an inner face opposite the outer face,
wherein the inner face includes a bottom surface portion to be welded to the assembly surface of the first part, a peripheral surface portion configured to come into contact with the contour of the wall surface of the at least one through orifice in the second part, and a surface portion that is to come into contact with the second surface of the second part, and wherein the bottom surface portion comprises a flat surface that extends from one side of the peripheral surface portion to an opposite side of the peripheral surface portion, and wherein the peripheral surface portion extends from the bottom surface portion to the surface portion along an entirety of the wall surface;
wherein at least part of the second part is arranged on the assembly surface of the first part such that the at least one through orifice extends across from said assembly surface, and wherein the connecting part is positioned on the at least one through orifice of the second part to cover said at least one through orifice across from the assembly surface of the first part, part of the second part comprising said at least one through orifice extending between the assembly surface and said connecting part;
wherein the connecting part and/or the assembly surface are projected on one another to obtain high-speed plating of the connecting part and the assembly surface on one another and to obtain welding between the connecting part and the assembly surface, the connecting part and/or the assembly surface being projected on one another at a speed greater than or equal to 150 meters per second;
wherein the second part comprises the at least one through orifice through which the connecting part is welded with the assembly surface of the first part;
wherein the connecting part is welded at the bottom surface portion to the assembly surface, the peripheral surface portion is in contact with the contour of the wall surface of the at least one through orifice, and the outer face is a free surface having reliefs forming hook spurs; and
wherein the bottom surface portion is parallel to and directly welded to the assembly surface, the peripheral surface portion is parallel to and in direct contact with the contour of the wall surface of the at least one through orifice, the surface portion is parallel to and in direct contact with the second surface of the second part, and wherein an entirety of the peripheral surface portion is perpendicular to the bottom surface portion, the entirety of the peripheral surface portion is perpendicular to the surface portion, and the surface portion and the bottom surface portion are parallel to each other.

12. The assembly according to claim 11, wherein the connecting part after welding has a shape complementary to the contour of the wall surface of the at least one through orifice of the second part.

13. The assembly according to claim 11, wherein the at least one through orifice of the second part comprises a plurality of through orifices, and wherein the connecting part comprises a single metal connecting part that is positioned to cover all through orifices of the second part.

14. The assembly of assembling according to claim 13, wherein the plurality of through orifices comprises at least three through orifices.

\* \* \* \* \*